US009523460B2

(12) United States Patent
Lee et al.

(10) Patent No.: US 9,523,460 B2
(45) Date of Patent: Dec. 20, 2016

(54) VACUUM INSULATION PANEL INCLUDING ANNEALED BINDERLESS GLASS FIBER

(71) Applicant: KCC Corporation, Seoul (KR)

(72) Inventors: Byung Won Lee, Cheonan-si (KR); Nam Su Lee, Wonju-si (KR); Jae Seol Ryu, Cheongju-si (KR); Sung Jun Lim, Jeju-si (KR); Sung Ho Kang, Seoul (KR)

(73) Assignee: KCC CORPORATION, Seoul (KR)

( * ) Notice: Subject to any disclaimer, the term of this patent is extended or adjusted under 35 U.S.C. 154(b) by 30 days.

(21) Appl. No.: 14/413,812

(22) PCT Filed: Jul. 12, 2013

(86) PCT No.: PCT/KR2013/006258
§ 371 (c)(1),
(2) Date: Jan. 9, 2015

(87) PCT Pub. No.: WO2014/010983
PCT Pub. Date: Jan. 16, 2014

(65) Prior Publication Data
US 2015/0192239 A1 Jul. 9, 2015

(30) Foreign Application Priority Data
Jul. 12, 2012 (KR) ........................ 10-2012-0076321

(51) Int. Cl.
| F16L 59/065 | (2006.01) |
| F16L 59/04 | (2006.01) |
| F16L 59/02 | (2006.01) |
| D04H 1/4218 | (2012.01) |

(52) U.S. Cl.
CPC ........... *F16L 59/065* (2013.01); *D04H 1/4218* (2013.01); *F16L 59/028* (2013.01); *F16L 59/04* (2013.01); *Y10T 428/231* (2015.01)

(58) Field of Classification Search
CPC ................ Y10T 428/231; F16L 59/065
See application file for complete search history.

(56) References Cited

U.S. PATENT DOCUMENTS

| 7,571,582 | B2 * | 8/2009 | Hirai | ..................... F16L 59/065 428/69 |
| 7,638,181 | B2 | 12/2009 | Tenra | |
| 2011/0165367 | A1 * | 7/2011 | Kojima | ................... E04B 1/803 428/69 |
| 2012/0009376 | A1 | 1/2012 | Rusek, Jr. | |

FOREIGN PATENT DOCUMENTS

| CN | 1148427 A | 4/1997 |
| CN | 1657282 A | 8/2005 |
| CN | 101059194 A | 10/2007 |
| EP | 1457612 A1 | 9/2004 |
| EP | 1653146 A1 | 5/2006 |
| EP | 2306128 A2 | 4/2011 |
| JP | 2005163212 A | 6/2005 |
| JP | 2005220954 A | 8/2005 |
| JP | 2005273696 A | 10/2005 |
| JP | 2005307995 A | 11/2005 |
| JP | 2006028649 A | 2/2006 |
| JP | 2006316988 A | 11/2006 |
| JP | 2007056922 A | 3/2007 |
| JP | 2008057745 A | 3/2008 |
| JP | 2012112065 A | 6/2012 |
| KR | 10-1999-0048791 A | 7/1999 |
| KR | 10-2003-0058921 A | 7/2003 |
| KR | 10-2003-0072717 A | 9/2003 |
| KR | 10-2006-0032656 A | 4/2006 |
| KR | 10-2006-0125463 A | 12/2006 |
| KR | 10-0746989 B1 | 8/2007 |
| KR | 10-2011-0040347 A | 4/2011 |

OTHER PUBLICATIONS

Extended European Search Report issued for a family European patent application No. 13816557.6, dated Jan. 25, 2016.
Office Action issued for a family Japanese patent application No. 2015-521551, dated Jan. 12, 2016.
English Translation of International Preliminary Report on Patentability under Chapter I (IPRP) issued for the PCT international application dated Jan. 22, 2015.
1st Office Action issued for a family Korean application No. 10-2015-7000593 dated Nov. 30, 2015.
1st Office Action issued for a family Chinese application No. 201380037130.6 dated Aug. 2, 2015.
International Search Report and Written Opinion dated Sep. 27, 2013 for corresponding International Patent Application No. PCT/KR2013/006258, filed Jul. 12, 2013.

* cited by examiner

*Primary Examiner* — Alexander Thomas
(74) *Attorney, Agent, or Firm* — Westman, Champlin & Koehler, P.A.; Amanda M. Prose

(57) ABSTRACT

Disclosed is a vacuum insulation panel having excellent thermal insulation and cold retention performance using conventional glass fibers. The vacuum insulation panel employs annealed binderless glass fibers as a core material, thus ensuring superior thermal insulation performance and preventing out-gassing in a vacuum due to the absence of organic residues in the fibers, and thereby a vacuum level of the vacuum insulation panel can be maintained for a long period of time.

8 Claims, No Drawings

VACUUM INSULATION PANEL INCLUDING ANNEALED BINDERLESS GLASS FIBER

CROSS-REFERENCE TO RELATED APPLICATIONS

This Application is a Section 371 National Stage Application of International Application No. PCT/KR2013/006258, filed Jul. 12, 2013, published as International Publication No. WO 2014/010983 on Jan. 16, 2014, in Korean, which is based on and claims the benefit of Korean Patent Application No. 10-2012-0076321, filed Jul. 12, 2012; the contents of which are hereby incorporated by reference in their entireties.

TECHNICAL FIELD

The present invention relates to a vacuum insulation panel having excellent thermal insulation and cold retention performance using conventional glass fibers. More particularly, the present invention relates to a vacuum insulation panel, which employs annealed binderless glass fibers as a core material, thus ensuring superior thermal insulation performance and preventing out-gassing in a vacuum due to the absence of organic residues in the fibers, and thereby a vacuum level of the vacuum insulation panel may be maintained for a long period of time.

BACKGROUND ART

With a paradigm shift to 'low carbon green growth', energy savings and greenhouse gas reductions are required in the construction sector. In order to increase the energy efficiency of buildings, high-performance building insulation panels have to be developed.

Currently useful building insulation panels, which are domestically manufactured and sold, are largely classified into organic insulation panels using polystyrene or polyethylene (e.g. Korean Patent Application Publication Nos. 1999-0048791 and 2011-0040347) and inorganic insulation panels resulting from high-temperature melting of ores and then formation thereof into fibers (e.g. Korean Patent Application Publication No. 2003-0058921). Although the organic insulation panels are inexpensive and have high workability, they are problematic because of poor heat resistance and ignition or generation of toxic gases in the event of fires. Also, the inorganic insulation panels rarely ever exhibit thermal insulation performance necessary for high efficiency.

Recently, because of the global eco-friendly and low energy consumption policy stance, the use of vacuum insulation panels is increasing. A vacuum insulation panel (VIP) is a high-efficiency insulation panel manufactured by placing a core material in a sealing member having air tightness and then making the inside thereof into a vacuum state, and may thus manifest thermal insulation performance at least 5~10 times greater than conventional insulation panels. Such a vacuum insulation panel may be utilized for refrigerators, cold storage warehouses, low-temperature liquefaction tanks, refrigerated containers, hot/cold vending machines, and building panels.

The core material of the vacuum insulation panel is conventionally composed of a polyurethane foam, but this foam is not eco-friendly and may cause a vacuum level to deteriorate due to out-gassing after a long period of time because it is an organic material. Also useful as the core material of the vacuum insulation panel, glass fibers are typically manufactured by a rotary process in such a way that silica, alumina, an alkali metal oxide, an alkaline earth metal oxide, and/or boron oxide are mixed, melted at a high temperature of 1400° C. or more and rotated at high speed using a rotary device such as a spinner to thus undergo a centrifugal force. When the glass fibers are manufactured in this way, an organic binder such as a phenol resin is applied to bonding between the glass fibers. However, such an organic binder is transformed into a gas during or after the vacuum process, and thus the vacuum may become weak, undesirably deteriorating thermal insulation performance of the insulation panel. Furthermore, when the glass fibers are used as the core material, the volume may undesirably increase upon vacuum degradation. As the thickness of the core material is not sufficiently ensured, the amount of glass fibers for the core material is increased, unfavorably increasing the material costs.

Korean Patent No. 10-746989, which is the prior patent of the present applicant, discloses a vacuum insulation panel, which includes needled binderless glass fibers as a core material. Although the needled binderless glass fibers do not cause out-gassing due to an organic material, the core material is oriented in a vertical direction during needling treatment, and thereby thermal insulation performance may become poor and thus does not satisfy the enhanced thermal insulation performance standard. Hence, there is a need to develop a new concept of high-efficiency insulation panels having superior thermal insulation performance with the use of binderless glass fibers, compared to conventional products.

DISCLOSURE

Technical Problem

Accordingly, the present invention has been made keeping in mind the above problems encountered in the related art, and the present invention is intended to provide a vacuum insulation panel, which has excellent thermal insulation and cold retention performance using conventional glass fibers, and may prevent out-gassing in a vacuum by excluding the use of an organic binder, ultimately obtaining small changes in thermal conductivity over time, and also which employs annealed glass fibers so that the glass fibers may be oriented in a horizontal direction and the thickness and density thereof may be adjusted, thereby exhibiting superior thermal insulation performance and lowering the material costs, compared to conventional organic or inorganic insulation panels.

Technical Solution

The present invention provides a vacuum insulation panel, comprising glass fibers as a core material, a gas adsorbent for adsorbing moisture and gas from an inside of the vacuum insulation panel, and an airtight sealing member for sealing the glass fibers, wherein the glass fibers are annealed binderless glass fibers obtained by annealing binderless glass fibers for a period of time ranging from 0.5 min to less than 20 min using an annealing furnace at 300~700° C.

As used herein, the term "binderless glass fibers" refer to glass fibers that are not treated with an organic binder such as a phenol resin, and may thus prevent out-gassing in a vacuum because an organic binder is not used.

According to the present invention, the binderless glass fibers may be uniformly oriented perpendicular to a direction of heat transfer, thus minimizing thermal conduction via the fibers.

In the present invention, an annealing process is applied, unlike a conventional glass fiber manufacturing process, without the use of an organic binder. Utilized in the annealing process according to the present invention, an annealing furnace is preferably a hot air permeable belt type annealing furnace. The annealing process according to the present invention is carried out in such a manner that basic wool is passed through a hot air permeable belt type furnace and thus is thermally expanded, and glass fibers are oriented in a horizontal direction to enhance thermal insulation performance, and an organic material and moisture are completely removed, thereby ensuring quality and productivity of the product without additional drying. Furthermore, it is easy to control the thickness and density of the binderless glass fibers. The hot air permeable belt has holes with a predetermined porosity, and the glass fibers are thermally treated by passing air at 300~700° C. through such holes. As such, the annealing treatment time is preferably set to the range from 0.5 min to less than 20 min. If annealing is performed at a temperature of lower than 300° C. or higher than 700° C., or is carried out for a period of time of less than 0.5 min or 20 min or more, the optimal density of the glass fibers cannot be obtained. Consequently, the thickness and density of the core material may be controlled by adjusting the annealing treatment time, temperature and belt height using the annealing furnace.

The unit weight of a binderless glass fiber product according to the present invention is preferably 0.6~2.0 kg/m². This is because the binderless glass fibers having a unit weight of 0.6~2.0 kg/m² is liable to have a thickness of 5~50 mm and a density of 150~400 kg/m³ adapted for a vacuum insulation member in a high vacuum of $10^{-4}$ Torr or less. If the unit weight of the binderless glass fibers for a vacuum insulation member is less than 0.1 kg/m², the thickness and density thereof may be less than 5 mm and 150 kg/m³, respectively, and thus the external deformation thereof may be easily caused even by a small force, undesirably incurring handling problems. In contrast, if the unit weight thereof exceeds 2.0 kg/m², the thickness and price of products may increase. Hence, the optimal unit weight is preferably set to 0.6~2.0 kg/m² to maintain the outer appearance of the vacuum insulation panel and to assure the appropriate weight/price thereof.

According to the present invention, the binderless glass fibers have an average fiber diameter of 7 μm or less, and preferably 3~5 μm. If the fiber diameter is larger, the thermal conductivity may increase and the fibers may easily break. Hence, the fiber diameter is preferably as small as possible. However, if the fiber diameter is too small, the lifetime of the spinner wheel and productivity may decrease, and thus the manufacturing cost is increased. The fiber diameter of 3~5 μm may be regarded as optimal in consideration of the thermal conductivity of glass fibers and productivity. Also, when the glass fibers having a fiber diameter of 3~5 μm are used, the number of pores of the final core material may increase, thereby achieving a lightweight product.

According to a preferred embodiment of the present invention, annealing treatment may be performed after laminating the binderless glass fibers in a single layer or two or more layers, and preferably two or three layers taking into consideration the performance and productivity. When the binderless glass fibers are laminated, the number of layers thereof may vary depending on the thickness of a final product, thereby increasing production efficiency.

The airtight sealing member for sealing the glass fibers according to the present invention may include those typically useful in vacuum insulation panels, and is not particularly limited. Preferably, the airtight sealing member according to the present invention is provided in the form of a multilayer film sequentially comprising a first outer layer selected from the group consisting of an inorganic oxide deposited polyethyleneterephthalate (PET) layer, a nylon layer, and a deposited oriented polypropylene (OPP) layer; a second outer layer selected from the group consisting of an inorganic oxide deposited PET layer, a nylon layer, and a deposited OPP layer; an aluminum foil layer; and a polyethylene heat-sealable layer.

In the present invention, an inorganic oxide deposited PET layer (hereinafter, referred to as 'GL-PET') usable as the first and/or the second outer layer functions to improve durability of the sealing member, and also, oxygen permeability of the sealing member may be further decreased due to the deposition of inorganic oxide. Moreover, the moisture permeability of the sealing member may be further lowered owing to moisture resistance of PET, thus supplementing barrier performance of an aluminum foil layer, as will be described below. Such GL-PET may be obtained by depositing an inorganic oxide such as aluminum oxide ($AlO_x$) to PET.

According to a preferred embodiment of the present invention, when the GL-PET layer and another layer (e.g. a nylon layer) are adhered, the inorganic oxide deposited side of the GL-PET layer is adhered in a direction that comes into contact with another layer.

In the present invention, the GL-PET layer may have a thickness of 10~15 μm when used as the first outer layer, and may have a thickness of 10~30 μm when used as the second outer layer. If the GL-PET layer is too thin, barrier performance may deteriorate. In contrast, if the GL-PET layer is too thick, handling performance may decrease and high price may result.

In the present invention, a nylon layer usable as the first and/or the second outer layer plays a role in enhancing durability, wear resistance and flexibility of the sealing member to thus prevent the generation of pinholes due to external impact during fabrication or use of the vacuum insulation panel. In the course of handling of the sealing member and the secondary processing (folding, bending, adhering, etc.), damage to the aluminum foil layer may be prevented, and air tightness may thus be maintained, and also, moisture barrier performance of the sealing member may be improved.

In the present invention, the nylon layer may have a thickness of 10~30 μm when used as the first outer layer, and may have a thickness of 15~30 μm when used as the second outer layer. If the nylon layer is too thin, flexibility may decrease and the number of pinholes may increase. In contrast, if the nylon layer is too thick, the envelope of the vacuum insulation panel may become thick, undesirably incurring handling problems and high price.

In the present invention, a deposited OPP layer usable as the first and/or the second outer layer is manufactured by stretching polypropylene uniaxially or biaxially, and possesses superior moisture resistance. In the present invention, the thickness of the deposited OPP layer is preferably 10~30 μm. If the deposited OPP layer is too thin, poor moisture resistance may result. In contrast, if the deposited OPP layer is thicker, the envelope of the vacuum insulation panel becomes thick, undesirably causing handling problems and high price.

The sealing member according to the present invention includes, as a barrier layer, an aluminum foil layer, in the sequence subsequent to the second outer layer. The thickness of the aluminum foil layer is 5~10 and preferably 7~9 μm. If the thickness of the aluminum foil layer is less than 5 μm, barrier performance may deteriorate and the number of pinholes may increase. Whereas, the thickness thereof exceeding 10 V may result in handling problems, high price, and thermal bridging.

The sealing member according to the present invention includes a polyethylene layer as a heat-sealable layer, in the sequence subsequent to the aluminum foil layer. The usable polyethylene may include linear low density polyethylene (LLDPE) or metallocene polyethylene (MPE). The thickness of the polyethylene heat-sealable layer is 40~60 and preferably 45~55 V. If the thickness of the polyethylene heat-sealable layer is less than 40 heat sealing strength may deteriorate. In contrast, if the thickness thereof exceeds 60 handling problems may occur.

Useful in the present invention, the gas adsorbent is positioned in the vacuum insulation panel and thus functions to adsorb gas or moisture from the outside depending on changes over time so as to maintain an inner vacuum level. Such a gas adsorbent is composed of calcium oxide (CaO), or a mixture of calcium oxide and a metal powder selected from the group consisting of zirconium, manganese, titanium, barium, iron, cobalt, aluminum, nickel, and chromium. For example, a Combogetter available from SAES Getters may be used.

The vacuum insulation panel according to the present invention may be manufactured by placing the annealed binderless glass fibers serving as a core material and the gas adsorbent in the sealing member and sealing them. When the thickness of the vacuum insulation panel is 5~50 mm, a final density falls in the range of 150~400 kg/m$^3$, and preferably, 200~300 kg/m$^3$. If the density falls out of the above range, the vacuum insulation panel does not satisfy a final thickness of 5~50 mm, and is difficult to apply and may show unsatisfactory thermal insulation performance.

According to the present invention, the vacuum insulation panel has a thermal conductivity of 0.0020 W/mK or less, and preferably 0.0016~0.0018 W/mK. Given the above range, desired thermal insulation performance can be exhibited.

Advantageous Effects

According to the present invention, a vacuum insulation member includes conventional glass fibers but excludes a binder, and thus can prevent out-gassing in a vacuum due to the absence of any organic material in the glass fibers, so that the vacuum level thereof can be maintained for a long period of time. Also, an annealing process enables thermal insulation performance of the fibers to be maximally retained without altering the shape of the fibers. Therefore, by virtue of annealing treatment, the vacuum insulation panel has small changes in volume thereof, and can be continuously produced.

MODE FOR INVENTION

A better understanding of the present invention may be obtained via the following examples and comparative examples which are set forth to illustrate, but are not to be construed as limiting the present invention.

<Measurement Method>

1. Measurement of Average Fiber Diameter

Binderless glass fibers are dispersed in alcohol, and then stirred using a magnetic bar. Some of the dispersion glass fibers are collected using a pipette and then dried to remove the alcohol. As such, to obtain a representative fiber diameter, the fibers in various positions are uniformly collected using a pipette. The dried fibers are uniformly dispersed in an amount of 1 cc in a mounting media solution added in one drop on a slide glass of an optimal microscope, after which the fibers are covered with a cover slip having a thickness of 0.1 mm, and the mounting media solution is dried and thus the fibers are fixed. As such, the fiber diameter of the glass fibers is determined by measuring at least 800 fibers at 1000 magnification using an optical microscope (Model: BX51, Olympus). To measure a more precise fiber diameter, an oil lens using an immersion oil (nd=1.516) is applied. An average fiber diameter is determined by use of an indirect method (Probabilistic method), and the equation thereof is as follows.

$$\text{Average fiber diameter: } D_{0m} = \frac{\sum D_i L_i}{\sum L_i}$$

In this equation, Di is a fiber diameter, and Li is a fiber length. The measured results of average fiber diameter of the glass fibers are shown in Table 1 below.

2. Thermal Conductivity

The thermal conductivity of a vacuum insulation panel resulting from using needled or annealed glass fibers as a core material was measured according to KS L 9016, ASTM C 518, and ISO 8301 using HC-074 made by EKO. HC-074 is a thermal conductivity meter for measuring thermal conductivity of a material via a heat flux method, and measurement is performed in such a manner that a material is placed between a high-temperature plate and a low-temperature plate and the thermal conductivity thereof is measured using a heat flux sensor. The calculation equation is as follows.

$$\lambda(W/mk) = \frac{Qh + QC}{2} \cdot \frac{L}{\Delta T}$$

In this equation, λ, is a thermal conductivity, Qh is a heat flux of the high-temperature plate, QC is a heat flux of the low-temperature plate, L is a sample thickness, and ΔT is a temperature difference between high temperature and low temperature.

Each plate of the thermal conductivity meter has a very high precision by directly controlling a heating/cooling device (a thermo module) of a semiconductor by means of a highly sensitive heat sensor. The measured results of thermal conductivity of the vacuum insulation panels are shown in Table 1 below.

3. Thickness and Density

The glass fibers are cut to a size of 1.0 m$^2$ or more, and the width, length and thickness thereof are measured to determine a volume and a weight, which are then substituted into the following equation, thus calculating the density of glass fibers.

$$\text{Density (kg/m}^3\text{)=weight }(W)\text{/volume }(V)$$

PREPARATIVE EXAMPLE

Preparation of Binderless Glass Fibers

A glass melt having a sodalime-based composition was placed in a spinner rotating at high speed, and compressed air and flame were sprayed when the glass passed through holes, thereby forming glass fibers. The glass fibers were laminated in wool form using a cotton condenser, and primarily compressed in a thickness direction via a rolling process. In order to maintain the shape of a core material, the wool was not added with an organic binder, but was placed in an annealing furnace and then pressed at high temperature and high pressure and thus shaped.

Example 1

In order to serve as a core material of a vacuum insulation panel, binderless glass fibers having an average fiber diameter of 4.8 μm were prepared without the use of an organic binder as mentioned above. The binderless glass fibers were laminated in a single layer and then annealed. As such, annealing was performed at 600° C. for 5 min. The annealed glass fibers were dried at 110° C. for 1 hr. The glass fibers thus dried were placed in a multilayer film type airtight sealing member and then treated in a high vacuum of $10^{-4}$ Torr, thereby manufacturing a vacuum insulation panel.

Example 2

A vacuum insulation panel was manufactured in the same manner as in Example 1, with the exception that the glass fibers were laminated in two layers.

Example 3

A vacuum insulation panel was manufactured in the same manner as in Example 1, with the exception that the glass fibers were laminated in four layers.

Example 4

A vacuum insulation panel was manufactured in the same manner as in Example 2, with the exception that annealing was performed for 0.5 min.

Example 5

A vacuum insulation panel was manufactured in the same manner as in Example 2, with the exception that annealing was performed for 1 min.

Example 6

A vacuum insulation panel was manufactured in the same manner as in Example 2, with the exception that annealing was performed for 3 min.

Example 7

A vacuum insulation panel was manufactured in the same manner as in Example 2, with the exception that annealing was performed at 300° C. for 10 min.

Example 8

A vacuum insulation panel was manufactured in the same manner as in Example 2, with the exception that annealing was performed at 300° C. for 20 min.

Example 9

A vacuum insulation panel was manufactured in the same manner as in Example 5, with the exception that annealing was performed at 700° C.

Example 10

A vacuum insulation panel was manufactured in the same manner as in Example 5, with the exception that annealing was performed at 550° C.

Comparative Example 1

A vacuum insulation panel was manufactured in the same manner as in Example 1, with the exception that the glass fibers having an average fiber diameter of 8.8 μm were used.

Comparative Example 2

A vacuum insulation panel was manufactured in the same manner as in Example 1, with the exception that annealing was performed at 200° C.

Comparative Example 3

A vacuum insulation panel was manufactured in the same manner as in Example 1, with the exception that annealing was performed at 800° C.

Comparative Example 4

A vacuum insulation panel was manufactured in the same manner as in Example 1, with the exception that annealing was performed for 0.25 min.

Comparative Example 5

A vacuum insulation panel was manufactured in the same manner as in Example 1, with the exception that annealing was performed for 25 min.

Comparative Example 6

A vacuum insulation panel was manufactured using binderless glass fibers subjected to needling, instead of annealing.

Comparative Example 7

An organic binder containing about 3% phenol resin was sprayed, and glass fibers having an average fiber diameter of 4.8 μm were manufactured, and then subjected to needling in the same manner as in Comparative Example 6, thereby manufacturing a vacuum insulation panel.

The results of Examples 1 to 10 are summarized in Table 1 below, and the results of Comparative Examples 1 to 7 are summarized in Table 2 below.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Density | 270 | 270 | 270 | 270 | 270 | 270 | 270 | 270 | 270 | 270 |
| Average fiber diameter of glass fibers (μm) | 4.8 | 4.8 | 4.8 | 4.8 | 4.8 | 4.8 | 4.8 | 4.8 | 4.8 | 4.8 |
| Annealing temp. (° C.) | 600 | 600 | 600 | 600 | 600 | 600 | 300 | 300 | 700 | 550 |
| Annealing time (min) | 5 | 5 | 5 | 0.5 | 1 | 3 | 10 | 20 | 1 | 1 |
| Number of layers of laminated core material (ply) | 1 | 2 | 4 | 2 | 2 | 2 | 2 | 2 | 2 | 2 |
| Outer appearance of annealed product | Good | Good | Good | Good | Good | Good | Good | Good | Good | Good |
| Thermal conductivity of VIP (W/m · K) | 0.00173 | 0.00191 | 0.00197 | 0.00185 | 0.00174 | 0.00188 | 0.00191 | 0.00189 | 0.00183 | 0.00184 |

The results of Comparative Examples 1 to 7 are given in Table 2 below.

TABLE 2

| | Comparative Example | | | | | | |
|---|---|---|---|---|---|---|---|
| | 1 | 2 | 3 | 4 | 5 | 6 | 7 |
| Density | 310 | 270 | 270 | 270 | 270 | 270 | 270 |
| Average fiber diameter of glass fibers (μm) | 8.8 | 4.8 | 4.8 | 4.8 | 4.8 | 4.8 | 4.8 |
| Annealing temp. (° C.) | 600 | 200 | 800 | 600 | 600 | Needling | Needling |
| Annealing time (min) | 5 | 5 | 5 | 0.25 | 25 | Needling | Needling |
| Number of layers of laminated core material (ply) | 1 | 1 | 1 | 1 | 1 | Needling | Needling |
| Outer appearance of annealed product | Good | Poor | Poor | Poor | Poor | Needling | Needling |
| Thermal conductivity of VIP (W/m · K) | 0.00205 | 0.00213 | 0.00209 | 0.00227 | 0.00215 | 0.00271 | 0.00337 |

As is apparent from Tables 1 and 2, the annealing treatment temperature and time were regarded as important to manufacture the binderless glass fibers as the core material. In particular, superior results were obtained under conditions of the annealing temperature of 300~700° C. and the annealing time of 2~10 min. As the annealing time was longer, productivity deteriorated. In consideration thereof, maximum performance and high productivity could be ensured under annealing conditions of about 550~650° C. and about 0.5~5 min.

The vacuum insulation panel (Comparative Example 6) using the needled binderless core material exhibited superior thermal insulation performance, compared to the vacuum insulation panel (Comparative Example 7) using the core material subjected to organic binder needling treatment. Moreover, thermal insulation performance of the vacuum insulation panels (Examples 1 to 10) using the annealed binderless core materials became outstanding.

Therefore, out-gassing can be prevented when not using an organic binder, and thus superior thermal insulation performance can be manifested. Furthermore, the annealing treatment enables the fiber orientation to be set to a horizontal direction and the residual moisture and organic material to be completely removed, resulting in excellent performance. As in Comparative Example 1, the use of glass fibers having a large fiber diameter may increase the density of a product, making it impossible to achieve a lightweight product.

The invention claimed is:

1. A vacuum insulation panel, comprising glass fibers as a core material, a gas adsorbent for adsorbing moisture and gas from an inside of the vacuum insulation panel, and an airtight sealing member for sealing the glass fibers, wherein the glass fibers are annealed binderless glass fibers obtained by annealing binderless glass fibers for a period of time ranging from 0.5 min to less than 20 min using a hot air permeable belt type annealing furnace at 300~700° C., and wherein the orientation of the glass fibers are uniform.

2. The vacuum insulation panel of claim 1, wherein the binderless glass fibers have an average fiber diameter of 7 μm or less.

3. The vacuum insulation panel of claim 1, wherein the annealing furnace is a hot air permeable belt type annealing furnace.

4. The vacuum insulation panel of claim 1, wherein annealing the binderless glass fibers is performed after laminating the binderless glass fibers in a single layer or two or more layers.

5. The vacuum insulation panel of claim 1, wherein the airtight sealing member is provided in a multilayer film sequentially comprising:
   a first outer layer selected from the group consisting of an inorganic oxide deposited polyethyleneterephthalate (PET) layer, a nylon layer, and a deposited oriented polypropylene (OPP) layer;
   a second outer layer selected from the group consisting of an inorganic oxide deposited PET layer, a nylon layer, and a deposited OPP layer;
   an aluminum foil layer; and
   a polyethylene heat-sealable layer.

6. The vacuum insulation panel of claim 1, wherein the gas adsorbent comprises calcium oxide; or a mixture of calcium oxide and a metal powder selected from the group consisting of zirconium, manganese, titanium, barium, iron, cobalt, aluminum, nickel, and chromium.

7. The vacuum insulation panel of claim 1, which has a thermal conductivity of 0.0020 W/mK or less.

8. The vacuum insulation panel of claim 1, which has a thickness of 5~50 mm and a final density of 150~400 kg/m$^3$.

* * * * *